Patented Nov. 22, 1949

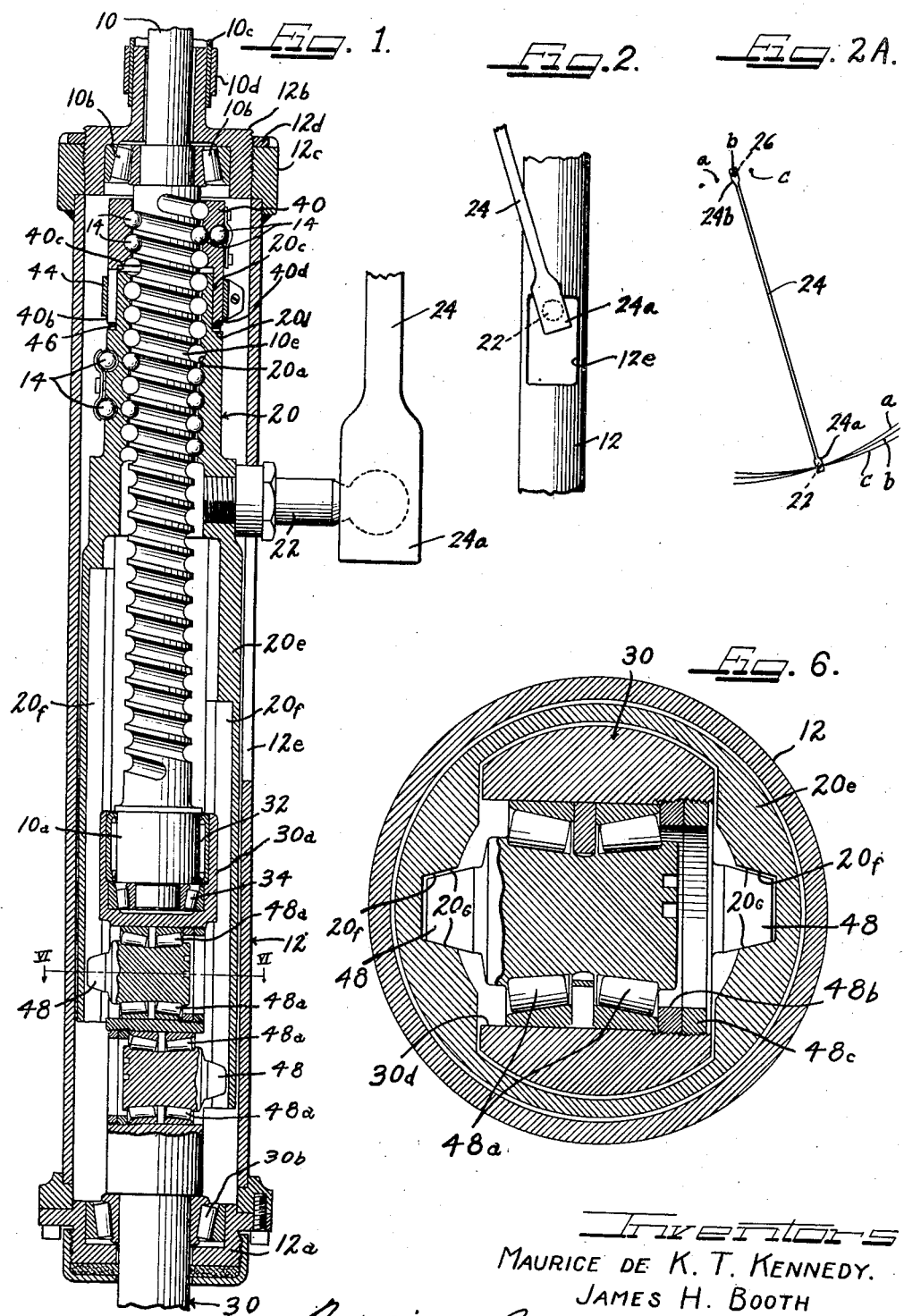

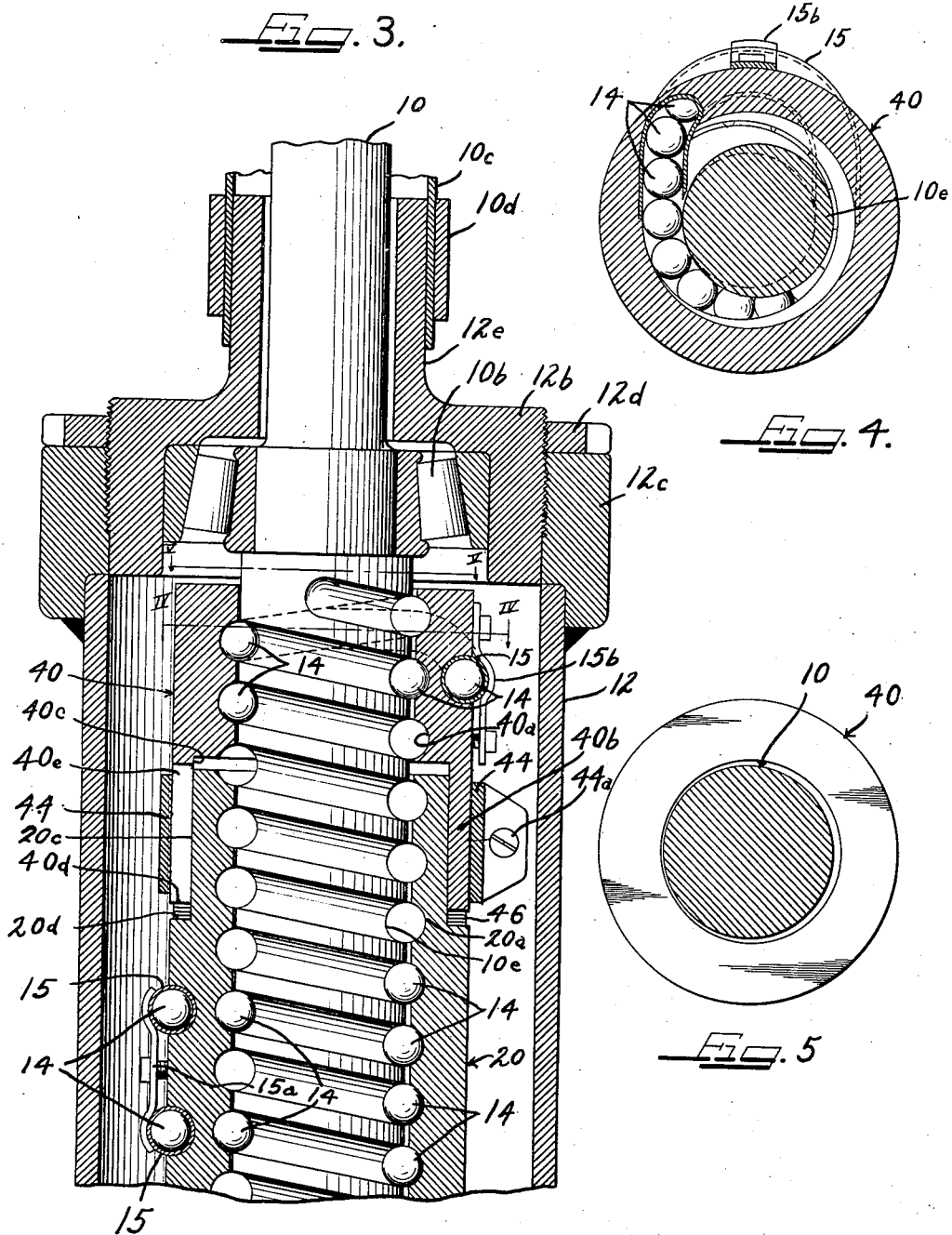

2,488,917

UNITED STATES PATENT OFFICE 2,488,917

STEERING GEAR

Maurice de K. T. Kennedy and James H. Booth, Detroit, Mich., assignors to Thompson Products, Inc., Cleveland, Ohio, a corporation of Ohio Application May 5, 1947, Serial No. 745,898

7 Claims. (Cl. 74—499)

This invention relates to a screw thread or transmission mechanism, and particularly to a screw thread mechanism employing ball nuts for use in the steering transmission of dirigible vehicles.

Ball nuts have heretofore been generally employed for translating the rotational movement of a steering shaft into an axial displacement for operation of the steering linkage of an automotive vehicle. The primary advantage resulting from the employment of a ball nut is, of course, the substantial reduction in frictional forces between such nut and the steering shaft operated worm. Despite the admitted advantage of ball nuts from a friction reduction standpoint, they have not heretofore enjoyed widespread usage in the automotive industry by virtue of at least two inherent disadvantages. In the first place, it is desirable that the gear reduction mechanism of a steering linkage exert a slight, yet adjustably predetermined drag between the dirigible wheels and the steering wheel in order to reduce the transmission of road shocks from the dirigible wheels to the steering wheel. Secondly, ball nut constructions heretofore known did not provide any suitable means for conveniently eliminating the backlash which is necessarily found in any cooperating screw threaded elements interchangeably produced on a large quantity production basis. As will be recognized by those skilled in the art, it is extremely undesirable to have any backlash in the transmission elements of a steering linkage.

A feature of this invention is that a ball nut construction is provided wherein both of the aforestated disadvantages are completely overcome. A screw threaded type transmission embodying this invention may be conveniently adjusted first to eliminate all backlash between the cooperating worm and ball nut, and secondly, to produce any desired amount of drag or frictional resistance between the ball nut and its cooperating worm. Such desirable features are accomplished by the provision of an additional ball nut also mounted on the helically grooved portion of the steering shaft adjacent to the primary ball nut. Such auxiliary ball nut is releasably rigidly secured to the primary ball nut in such manner as to produce an eccentricity between either one or both of the ball nuts and the grooved shaft. Such eccentricity produces a radial preloading of the balls of the ball nuts and the amount of such free loading is conveniently variable by shifting the relative angular position in which the primary ball nut and preloading auxiliary ball nut are clamped.

This invention also contemplates the provision of cooperating axial abutments respectively on the primary and auxiliary ball nuts arranged to permit the selective insertion of shims therebetween so that a predetermined axial preloading force may be exerted upon the balls of both ball nuts with respect to the grooved steering shaft in any selected relative angular position of the two ball nuts with respect to each other. In this manner, a combined radial and axial preloading is produced on the ball elements of the two ball nuts and both radial and axial components thereof are conveniently adjustable and may be regulated to obtain a predetermined amount of frictional drag between the steering shaft and the ball nuts for shock damping purposes, and at the same time, all backlash in the coupling between the steering shaft and the primary ball nut is substantially eliminated.

Accordingly, it is an object of this invention to provide an improved thread transmission mechanism, and particularly an improved worm and ball nut arrangement which is unusually adaptable to automotive vehicle steering linkages.

A further object of this invention is to provide mechanism for effecting either radial or axial preloading of the balls of a ball nut with respect to its cooperating worm to eliminate backlash between the worm and the ball nut or to provide a predetermined frictional drag between such cooperating elements.

A particular object of this invention is to provide a preloading mechanism for a ball nut comprising an additional ball nut selectively rigidly securable to the primary ball nut in any one of a plurality of relative angular positions, such preloading ball nut being somewhat eccentric with respect to the grooved shaft with which both ball nuts cooperate so as to produce a radial preload on the balls of both ball nuts with respect to the groove shaft.

A further object of this invention is to provide an improved worm and ball nut gear reduction mechanism for the steering linkage of an automotive vehicle.

The specific nature of the invention as well as other objects and advantages thereof will become apparent to those skilled in the art from the following detailed description of the annexed sheets of drawings which, by way of preferred example only, illustrate one specific embodiment of the invention.

On the drawings:

Figure 1 is a diagrammatic sectional view of an assembled thread and ball nut transmission for an automotive steering linkage embodying this invention;

Figure 2 is a partial plan view of Figure 1 showing the connection of the primary ball nut member to the control arm of the steering assembly;

Figure 2A is a diagrammatic view of the control arm adjustment;

Figure 3 is an enlarged scale view of that portion of Figure 1 containing the ball nut members;

Figure 4 is a sectional view taken on the plane IV—IV of Figure 3;

Figure 5 is a sectional view taken on the plane V—V of Figure 3; and

Figure 6 is an enlarged scale sectional view taken on the plane VI—VI of Figure 1.

As shown on the drawings:

While not limited thereto, a ball nut and thread type of gear reduction mechanism embodying this invention is conveniently illustrated as applied to a variable ratio steering assembly of the type more particularly described in the James H. Booth Patent No. 2,417,073, granted March 11, 1947. Thus rotational movement of a steering shaft 10 is caused to produce an axial movement of a primary ball nut member 20. A ball ended stud 22 is rigidly connected to ball nut member 20 and projects radially outwardly therefrom to have its ball end seated in the socket end 24a of a control arm 24. As shown in Figure 2A the control arm 24 has a socket 24b on the other end thereof receiving an adjustable pivot anchor stud 26. Shifting of the anchor 26 to positions a, b, and c will force the stud 22 to travel in different arcs a, b, and c thereby resolving longitudinal movements of the stud 22 into desired degrees of rotating movement.

As is more particularly described in said James H. Booth Patent No. 2,417,073, the selective shifting of the pivotal position of anchor stud 26 varies the extent of resolution of the axial movement of the primary ball member into rotational movement, and thereby provides a convenient method for selectively adjusting the effective gear ratio of the steering linkage. As will be later described, the rotational movement of primary ball nut member 20 is employed to rotate a pitman arm shaft 30, which is connected by any desired form of conventional linkage to the dirigible steering wheels (not shown) of the automotive vehicle.

Considering now the construction of the gear reduction mechanism in more detail, the entire mechanism may be conveniently housed within the interior of a tubular casing 12. Steering shaft 10 projects into one end of casing 12 while the pitman arm shaft 30 projects into the other end thereof. The inserted end of pitman arm shaft 30 is provided with an integral, enlarged cup-shaped portion 30a which receives a cylindrical end portion 10a of steering shaft 10 therein in nested relation. Needle bearings 32, as well as angularly disposed roller thrust bearings 34 may be conveniently mounted between the shaft end portions 30a and 10a to freely journal such shafts for relative rotation. An angularly disposed roller thrust bearing unit 30b is mounted in an end cap 12a to journal pitman arm shaft 30 within casing 12 while a similar roller bearing unit 10b is mounted in an end cap 12b at the other end of casing 12 to journal steering shaft 10. End cap 12b is axially adjustable relative to casing 12 by virtue of being screwed into a ring 12c and locked thereto by locking ring 12d. Ring 12c is welded to the end of casing 12. By virtue of this adjustment, all axial play in the bearings 10b, 30b and 34 journaling the steering shaft 10 and pitman arm shaft 30 may be taken up and a predetermined amount of axial preload placed upon such bearings, if desired, by tightening the end cap 12b into the support ring 12c.

End cap 12b also embodies an axially extending hub portion 12e upon which the conventional steering shaft housing 10c may be rigidly secured by a suitable clamp 10d.

That portion of steering shaft 10 lying within the casing 12 is provided with a concentric helical groove 10e. As previously indicated, a primary ball nut member 20 is provided which is insertable within casing 12 and has an internally helically grooved portion 20a complementary to the grooved portion 10e and cooperating therewith in threaded relationship by virtue of the provision of one or more continuous ring of balls 14 operating therebetween in the usual manner. In the particular example illustrated, two sets of rings of balls are employed between ball nut 20 and steering shaft 10. A ball return tube 15 is mounted in the grooved portion 20a of the ball nut 20 in conventional fashion (as exemplified by Figure 4) to supply a return path for each ring of balls 14. A single clamp 15a may be employed to retain both tubes 15 in position on the ball nut 20. It should be distinctly understood that the particular arrangement of a return path for the balls of the ball nut 20 constitutes no part of this invention and may conveniently comprise any one of several well known arrangements. In any event, the balls 14 produce an effective threaded coupling between the ball nut 20 and the steering shaft 10 so that rotation of steering shaft 10 results in an axial displacement of the ball nut 20.

According to this invention, an additional ball nut 40 is provided for preloading purposes. Auxiliary ball nut 40 has an internally grooved portion 40a which is complementarily formed with respect to the helically grooved portion 10e of steering shaft 10. Balls 14 and return tube 15 and clamp 15b are provided which are similar to those elements of ball nut 20.

Preloading ball nut 40 is positioned adjacent one end of primary ball nut 20. Preloading ball nut 40 is provided with an axially extending annular flange 40b having an internal cylindrical surface 40c which overrides and snugly engages a cylindrical surface 20c provided on primary ball nut 20. In accordance with this invention, when the two ball nuts are secured together, the helically grooved portion 40a of auxiliary ball nut 40 can be displaced laterally with respect to the helically grooved portion 20a of primary ball nut 20 by indexing nut 40 in relation to nut 20. Such condition is preferably produced by having at least one of the nested cylindrical surfaces 20c and 40c of the nut members slightly eccentric with respect to the axis of steering shaft 10.

When the preloading ball nut 40 is rigidly secured to the primary ball nut 20 by any suitable means, the inherent eccentricity therebetween results in a cocking of both ball nuts with respect to the helically grooved portion 10e of the steering shaft 10. Such cocking necessarily produces a radial preloading force upon the ball elements 14 of the ball nuts. Furthermore, with the described construction employing nested cylindrical surfaces 20c and 40c on the two ball nut members, the extent of eccentricity of the two ball nut members is variable according to the relative angular position of the ball nut members. An adjustment of the relative angular position of the ball nut members will effect a variation in the relative eccentricity, hence in the radial preloading forces exerted upon the balls 14.

The rigid coupling of the preloading ball nut member 40 to the primary ball nut member 20, as well as the selective adjustment of the regular angular positions of the two ball nut members is conveniently accomplished by providing an axially extending slit 40e in the flange 40b of ball nut member 40 and then clamping the flange portion 40b tightly around cylindrical surface 20c in any selected angular relationship of the two ball nut members by a conventional split ring clamp 44 operable by a locking bolt 44a.

Now, in addition to the application of a predetermined amount of radial preloading, the preloading ball nut member 40 may also be employed in cooperation with the primary ball nut member 20 to produce a predetermined axial preloading of the balls 14 with respect to the steering shaft grooves 10e. Such axial preloading may be conveniently obtained by the provisions of axially spaced abutment members respectively on the primary ball nut member 20 and the preloading ball nut member 40 which are drawn up tightly against a selected number of shims inserted therebetween. Thus by varying the number of shims, or the axial separation of the abutments when the two nut members are locked together, a predetermined axial force may be created between each of the ball nut members and the steering shaft 10 at any selected relative angular position.

In the construction illustrated in the drawings, an abutment means on the preloading auxiliary ball nut member 40 may conveniently comprise the end face 40d of axially extending flange 40b, while the cooperating abutment member on the primary ball nut member 20 may comprise the shoulder 20d provided at the juncture of cylindrical surface 20c with the main body portion of the primary ball nut member. A plurality of semi-circular shims 46 may then be selectively inserted between the opposed abutment surfaces 40d and 20d and the primary ball nut 20 advanced toward the preloading ball nut 40, or vice versa, to compress the shims therebetween and obtain the desired amount of axial preloading force at the selected relative angular position corresponding to a predetermined radial preloading.

As was previously mentioned, a stud shaft arm 22 is threadably secured to the primary nut member 20 in general radial relationship thereto to function as a control link to convert a portion of the axial movement of the primary ball nut 20 into a rotational component. Control stub shaft 22 projects outwardly of casing 12 through a suitable elongated slot 12e provided therein.

Ball nut member 20 is also provided with an integral, axial extending tubular portion 20e which extends through the casing 12 a sufficient distance so as to surround the inserted end portion of the pitman arm shaft 30. A plurality of grooves 20f (Figure 6) are provided in the interior surface of tubular extension 20e and such grooves respectively cooperate with roller guide pins 48 which are respectively journaled in the casing inserted portion of pitman arm shaft 30 in generally transverse relationship thereto. These grooves can be straight or curved. In the particular example illustrated, two longitudinally extending grooves 20f are provided, and accordingly, two roller guide pins 48 are provided, projecting respectively out of diametrically opposite sides of the pitman arm shaft 30. Each of the roller guide pins 48 are journaled in a pair of opposed cone roller bearing units 48a. Roller bearing units 48a are slidably mounted in transversely extending holes 30d in the pitman arm shaft 30 and are radially adjustable in such holes by an adjusting nut 48b and locking nut 48c. As best shown in Figure 6, the side walls 20g of the longitudinal grooves 20f are of inclined configuration and the roller pins 48 are tapered in corresponding manner. Hence adjustment of the roller pin bearing unit 48a outwardly with respect to pitman arm shaft 30 will produce a snug engagement of the roller guide pins with one of the tapered side walls of the longitudinal grooves 20f.

As specifically illustrated in Figure 6, the transverse holes 30d in pitman arm shaft 30 in which the roller guide pins 48 are journaled are preferably located so that each of the roller guide pins 48 contact an inclined side wall 20g of the longitudinal grooves 20f at the same side of a horizontal plane passing through the axis of the roller guide pins. Such arrangement insures that no backlash will exist between primary ball nut 20 and pitman arm shaft 30 irrespective of the direction of rotation of the primary ball nut.

From the foregoing description, it is apparent that this invention provides a simple, yet rugged and dependable mechanism for effecting both axial and radial predetermined preloadings of the balls of a ball nut and worm transmission. Furthermore, when applied to a steering mechanism for automotive vehicles, the preloading ball nut 40 permits a predetermined amount of drag to be introduced between the steering shaft and the remaining elements of the steering linkage. At the same time, the provision of the preloading ball nut 40 substantially eliminates all backlash between the grooved steering shaft and the cooperating primary ball nut member.

It will, of course, be understood that various details of construction may be modified through a wide range without departing from the principles of this invention and it is, therefore, not the purpose to limit the patent granted hereon otherwise than necessitated by the scope of the appended claims.

We claim as our invention:

1. A screw thread mechanism of the character described comprising a shaft formed with a helical groove, a pair of ball nuts cooperating with said shaft, means for clamping said ball nuts together in any selected one of a plurality of angularly displaced relative positions, at least one of said ball nuts having a helical ball groove cooperating with said shaft groove which is eccentric with respect to said shaft groove in the clamped position of said ball nuts, whereby adjustment of the relative angular positions of said ball nuts produces a variable radial preloading of the balls of said ball nuts.

2. A screw thread mechanism of the character described comprising a shaft formed with a helical groove, a pair of ball nuts respectively cooperating with said shaft, means interconnecting said ball nuts to position said nuts non-concentrically with respect to said shaft, the extent of eccentricity of said ball nuts being determined by the relative angular position of said ball nuts, and means for clamping said ball nuts together in any selected relative angular position, whereby adjustment of the relative angular positions of said ball nuts produces a variable radial preloading of the balls of said ball nuts.

3. In a steering transmission for dirigible vehicles, a steering shaft having a helical groove formed thereon, a primary ball nut mounted on said grooved portion of said shaft and axially movable thereby, a preloading ball nut mounted on said grooved portion of said shaft adjacent said primary ball nut, an axially extending, axially split flange on one of said ball nuts surrounding a portion of the other ball nut, a releasable clamp surrounding said flange, whereby said ball nuts may be rigidly secured together in any selected one of a plurality of angularly displaced positions, said preloading ball nut having a helical ball groove cooperating with said shaft groove which is nonconcentric with respect to said shaft in the clamped position of said ball nut, whereby adjustment of the relative angular positions of said ball nuts produces a variable radial preloading of the balls of said ball nuts.

4. In a steering transmission for dirigible vehicles, a steering shaft having a helical groove formed thereon, a primary ball nut mounted on said grooved portion of said shaft and axially movable thereby, a preloading ball nut mounted on said grooved portion of said shaft adjacent said primary ball nut, an axially extending cylindrical flange on one of said ball nuts snugly surrounding a cylindrical portion on the other ball nut, said nested cylindrical surfaces being nonconcentric with respect to said shaft axis, whereby the helical ball grooves of said ball nuts are eccentric with respect to said shaft groove to an extent determined by the relative angular position of said ball nuts, and means for rigidly securing said ball nuts together in any selected relative angular position, whereby adjustment of the relative angular positions of said ball nuts produces a variable radial preloading of the balls of said ball nuts.

5. A screw thread mechanism of the character described comprising a shaft formed with a helical groove, a pair of ball nuts respectively cooperating with said shaft, means for producing a predetermined axial force between each of said ball nuts and said shaft at any selected relative angular position of said ball nuts, thereby axially preloading the balls of said ball nuts, and means for clamping said ball nuts together in any selected relative angular position, at least one of said ball nuts having a helical ball groove which is non-concentric with respect to said shaft groove to an extent determined by the relative angular position of said ball nuts when clamped, whereby adjustment of the relative angular positions of said ball nuts produces a variable radial preloading of the balls of said ball nuts.

6. A screw thread mechanism of the character described comprising a shaft formed with a helical groove, a pair of ball nuts respectively cooperating with said shaft, cooperating abutment means on said ball nuts limiting axial movements of said nuts toward each other, shims selectively insertable between said abutment means to produce a predetermined axial force between each of said ball nuts and said shaft at any selected relative angular position of said ball nuts, thereby axially preloading the balls of said ball nuts, means for clamping said ball nuts together in any selected relative angular position, at least one of said ball nuts having a helical ball groove cooperating with said shaft groove which is nonconcentric with respect to said shaft groove in the clamped position of said ball nuts, whereby adjustment of the relative angular positions of said ball nuts produces a variable radial preloading of the balls of said ball nuts.

7. In a steering transmission for dirigible wheels, a tubular casing, a steering shaft extending into one end of said casing and journaled thereby, a pitman arm shaft projecting into the other end of said casing and journaled thereby, said steering shaft having a helical groove on that portion lying within said casing, a primary ball nut cooperating with said grooved shaft portion and axially movable by rotation of said shaft, means operable by axial movement of said primary ball nut for rotating said primary ball nut, said primary ball nut having an axially extending, annular flange overlying a portion of said pitman arm shaft, said flange having a plurality of longitudinal, internal grooves, a plurality of roller studs transversely journaled in said pitman arm shaft and respectively engaging said longitudinal grooves, whereby said primary ball nut rotates said pitman arm shaft, means for adjusting said roller studs axially to eliminate backlash between said studs and said grooves, a secondary ball nut mounted on said grooved portion of said steering shaft adjacent said primary ball nut, means for clamping said ball nuts together in any selected one of a plurality of angularly displaced positions, at least one of said ball nuts having a helical ball groove cooperating with said shaft groove which is non-concentric with respect to said shaft groove in the clamped position of said ball nut, whereby adjustment of the relative angular positions of said ball nuts produces a variable radial preloading of the balls of said ball nuts.

MAURICE DE K. T. KENNEDY.
JAMES H. BOOTH.

REFERENCES CITED

The following references are of record in the file of this patent:

UNITED STATES PATENTS

| Number | Name | Date |
|---|---|---|
| 109,348 | Foss et al. | Nov. 15, 1870 |
| 697,332 | Doney | Apr. 8, 1902 |
| 1,149,333 | Boyer | Aug. 10, 1915 |
| 1,319,294 | Lavigne | Oct. 21, 1919 |
| 2,267,524 | Hawkins | Dec. 23, 1941 |